No. 612,585. Patented Oct. 18, 1898.
J. E. FLAMMER.
TREE GUARD.
(Application filed June 14, 1898.)
(No Model.)
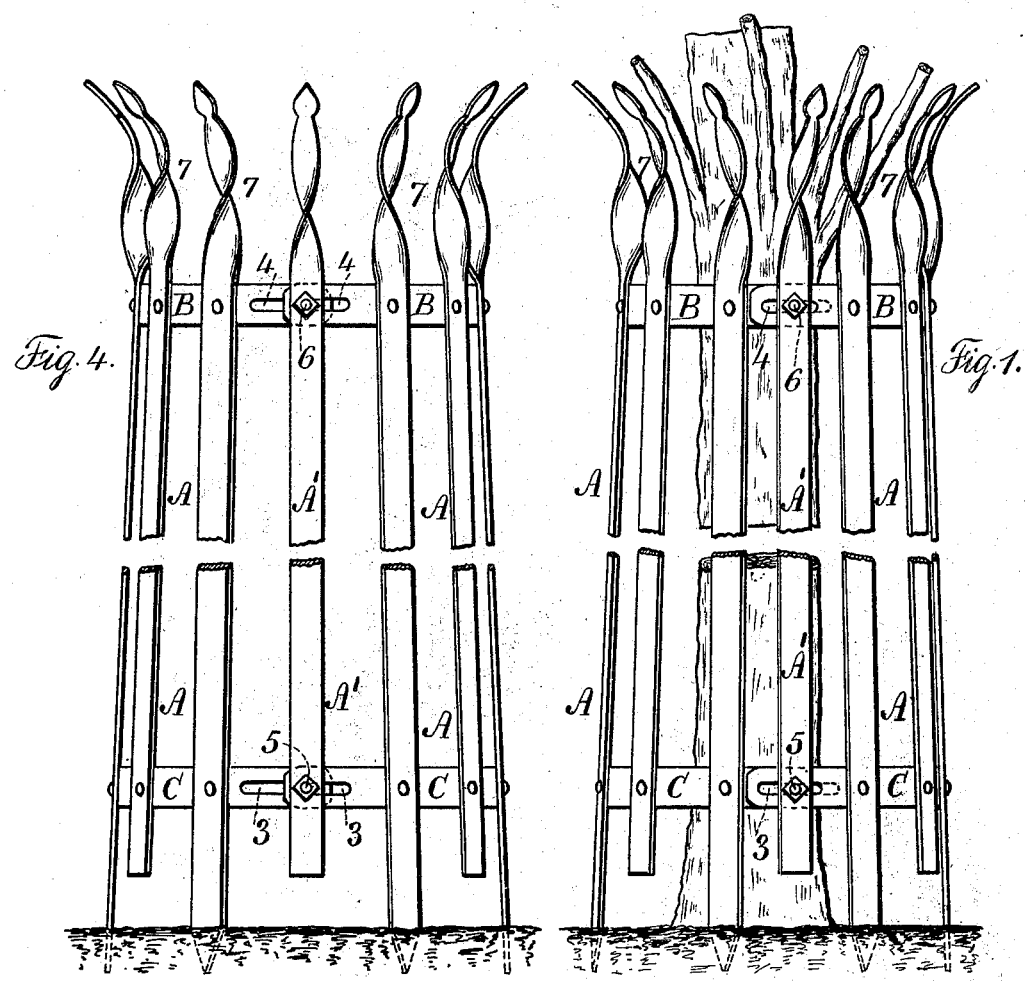
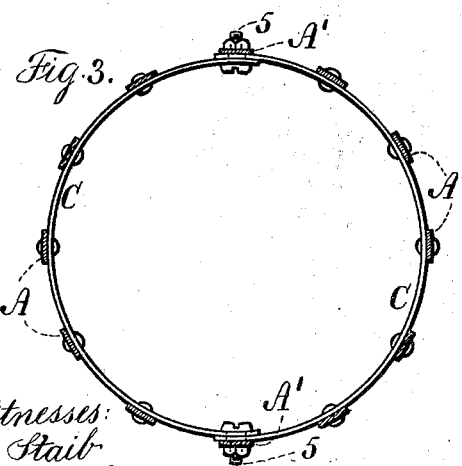
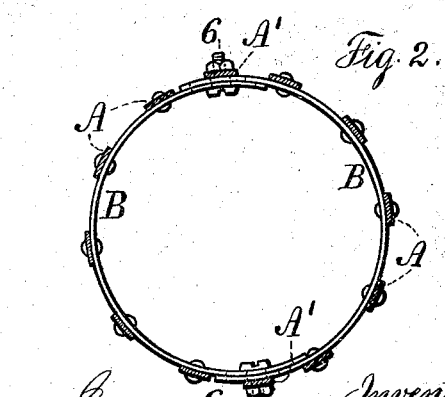
Witnesses:
J. Staib
Chas H. Smith
Inventor:
John E. Flammer
per L. W. Serrell & Son Attys

UNITED STATES PATENT OFFICE.

JOHN E. FLAMMER, OF WARRENVILLE, NEW JERSEY.

TREE-GUARD.

SPECIFICATION forming part of Letters Patent No. 612,585, dated October 18, 1898.

Application filed June 14, 1898. Serial No. 683,393. (No model.)

*To all whom it may concern:*

Be it known that I, JOHN E. FLAMMER, a citizen of the United States, residing at Warrenville, in the county of Somerset and State of New Jersey, have invented an Improvement in Tree-Guards, of which the following is a specification.

The present invention is made with reference to facilitating the enlargement of the guard from time to time as the tree may grow and also for filling up the space between the end pickets of the half-circle guards, so as to protect the tree when the guard has been enlarged, and I also provide for adapting the guard to any irregularity or crookedness in the trunk of the tree.

In the drawings, Figure 1 is an elevation representing the guard as applied around the trunk of a tree. Fig. 2 is a plan view of the upper hoop or band with the pickets in section. Fig. 3 is a similar view of the lower band extended, and Fig. 4 is a view similar to Fig. 1 with the band extended and adapted to a tree of larger size.

The pickets A are of suitable size, and, according to the requirements, they may be longer or shorter. They are usually of flat or band iron, and the upper ends are reduced and pointed, as shown, preferably with heart-shaped points.

The lower band C is preferably longer than the upper band B, so that the tree-guard can be made of greater diameter at the bottom than at the upper band for accommodating the size of the tree and also adapting the guard to the shape of said tree.

The bands B and C are made in half-sections, each being a segment of a circle of more than one hundred and eighty degrees, and the end portions of all of the bands are slotted longitudinally, as shown at 3 4, so that the connecting-bolts 5 and 6 can pass through the slots and the nuts of the bolts clamp the parts of the bands together, and it is advantageous to make the slots in the inner segments of the bands longer than the slots in the outer segments of the bands, so that the stationary pickets that are riveted or otherwise rigidly secured to the bands may be near the ends of the slots, the slotted portions of the bands projecting beyond the rivets. By simply loosening the nuts of the bolts the guard may be expanded or contracted to suit the size of the tree, because one band will slide against the other when the bolts are slackened without having to remove the nuts.

The pickets A' are perforated, so that the bolts 5 and 6 pass through the same, and after the two parts of the guard have been put together around the tree the bolts 5 and 6 are passed through the slots and also through the holes in the intermediate pickets A', and the nuts are screwed upon the bolts to clamp the parts firmly together, and the pickets A' can be equidistant, or nearly so, from the end pickets of the respective sections of the tree-guard.

It is advantageous to make the heads of the bolts 5 and 6 with projections adapted to fit the slots in the upper or lower bands, so that the bolt will be held from revolving when the nut is tightened or loosened. By making the upper band B and the lower band C slightly conical or tapering the same are adapted to the inclination of the pickets.

In consequence of the upper ends of the pickets being twisted, as shown at 7, the metal is stiffened, and where the tree is crooked or where there are branches passing off laterally one or more of said pickets can be bent at such portion of the twist as will cause the picket to avoid the tree.

By the present improvement the guard is variable and can easily be adapted by an ordinary workman to any size or shape of tree, and the guard becomes a reliable and easily-adapted protection to the various kinds of trees for which the guard is intended, and the same can be enlarged from time to time, as aforesaid, by simply slackening the nuts without removing them and slipping the parts to the desired positions, and the intermediate picket that is supported by the bolts allows of the enlargement being made with facility without the space becoming objectionably wide between the fixed pickets.

It is generally advantageous to point the lower ends of the pickets, so that they will pass into the ground to the desired depth. I have shown alternating pickets as pointed, so as to be forced in between the roots.

I claim as my invention—

As a new article of manufacture, tree-guard sections having vertical pickets, bands rigidly connected to the pickets and slotted at the end portions that project beyond the pickets, bolts passing through the slots and nuts thereon and intermediate pickets perforated for the passage of the bolts and secured between the rigid end pickets of the tree-guard sections, substantially as set forth.

Signed by me this 11th day of June, 1898.

JOHN E. FLAMMER.

Witnesses:
 JOHN F. MUNDY,
 VINCENT W. NASH.